(12) United States Patent
Sugimoto

(10) Patent No.: US 8,463,647 B2
(45) Date of Patent: Jun. 11, 2013

(54) ELECTRONIC SHELF LABEL SYSTEM

(75) Inventor: Takashi Sugimoto, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 152 days.

(21) Appl. No.: 13/040,506

(22) Filed: Mar. 4, 2011

(65) Prior Publication Data
US 2011/0218844 A1   Sep. 8, 2011

(30) Foreign Application Priority Data

Mar. 5, 2010   (JP) ................................. 2010-049715

(51) Int. Cl.
G06Q 30/00   (2012.01)

(52) U.S. Cl.
USPC ....................................... 705/14.4; 705/14.68

(58) Field of Classification Search
USPC .......................................... 705/14.4; 345/635
See application file for complete search history.

(56) References Cited

U.S. PATENT DOCUMENTS

| | | | |
|---|---|---|---|
| 6,717,522 B1 | 4/2004 | Nagatomo et al. | |
| 7,152,040 B1 * | 12/2006 | Hawthorne et al. | 705/16 |
| 2003/0234819 A1 * | 12/2003 | Daly et al. | 345/810 |

FOREIGN PATENT DOCUMENTS

| | | |
|---|---|---|
| JP | 2001-134225 | 5/2001 |
| JP | 2001-222769 | 8/2001 |
| JP | 2005-099888 | 4/2005 |
| JP | 2008-107522 | 5/2008 |
| JP | 2008-123046 | 5/2008 |
| JP | 2008-206551 | 9/2008 |
| JP | 2008-298902 | 12/2008 |
| JP | 2009-053742 | 3/2009 |
| JP | 2010-139751 | 6/2010 |
| JP | 2010-191582 | 9/2010 |

OTHER PUBLICATIONS

Japanese Office Action for Japanese Application No. 2010-049715 mailed on May 22, 2012.
Japanese Office Action for Japanese Application No. 2010-049715 mailed on Feb. 7, 2012.

* cited by examiner

Primary Examiner — John Weiss
Assistant Examiner — Scott C Anderson
(74) Attorney, Agent, or Firm — Turocy & Watson, LLP

(57) ABSTRACT

An electronic shelf label system according to an embodiment includes a shelf label terminal, an advertisement terminal, and a management server. The shelf label terminal displays shelf label information based on received shelf label data. The advertisement terminal displays advertisement information based on received advertisement data. The management server transmits the shelf label data to the shelf label terminal and transmits the advertisement data to the advertisement terminal.

15 Claims, 9 Drawing Sheets

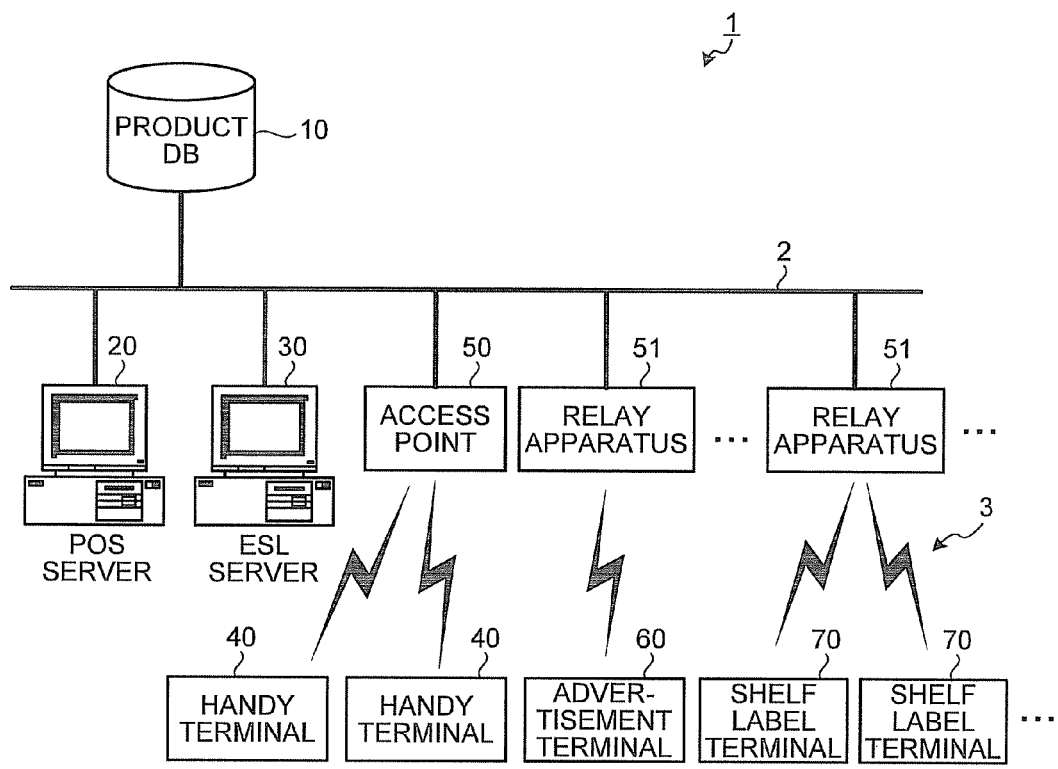

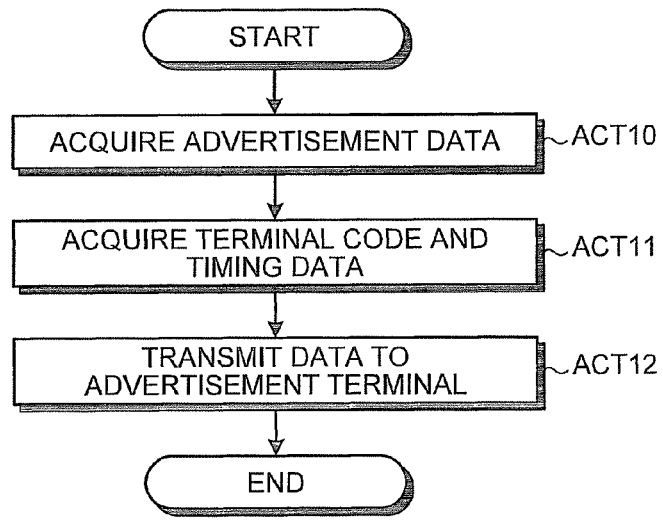
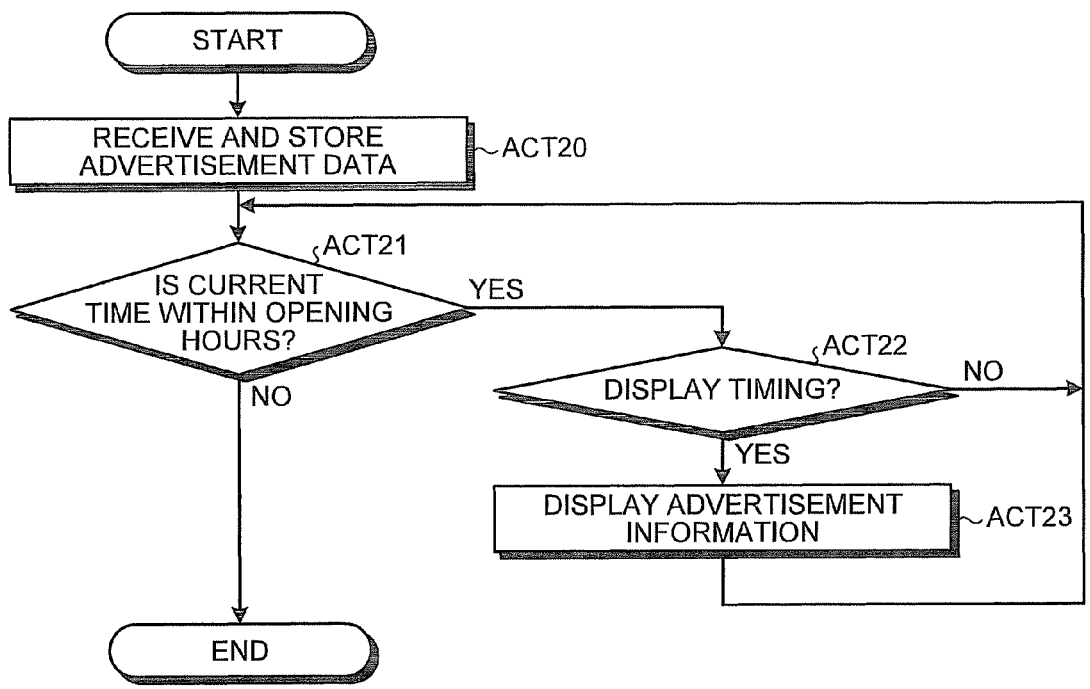

ELECTRONIC SHELF LABEL SYSTEM

CROSS-REFERENCE TO RELATED APPLICATION

This application claims the benefit of priority from Japanese Patent Application No. 2010-049715, filed Mar. 5, 2010, the content of which is incorporated herein by reference.

FIELD

Embodiments described herein relate generally to an electronic shelf label system.

BACKGROUND

In the past, there was known an electronic shelf label system digitalizing shelf labels showing the prices of products. In the electronic shelf label system, a handy terminal reads codes for identifying products from each other and codes for identifying shelf labels. Then, the electronic shelf label system associates the products with the shelf labels. Data of the products are transmitted to the shelf labels associated with the products via a wireless network or a wired network and information regarding the prices or the like of the products is displayed on the shelf labels.

In the past, POP (Point Of Purchase) advertisements or the like were displayed to promote sales in stores.

However, since the POP advertisements for products are published in a paper medium, it takes some time to update the advertisements. In particular, it is difficult to publish advertisements in a situation where the advertisements are urgently published or a situation where the details of the advertisements of prices or the like are changed.

BRIEF DESCRIPTION OF THE DRAWINGS

FIG. 1 is a block diagram illustrating the overall configuration of an electronic shelf label system according to an embodiment.

FIG. 2 is a diagram illustrating an example of product data of the electronic shelf label system according to the embodiment.

FIG. 10 is a flowchart illustrating an example of a sequence in which the ESL server transmits advertisement data in the electronic shelf label system according to the embodiment.

FIG. 11 is a flowchart illustrating an example of a sequence in which the advertisement terminal displays advertisement information in the electronic shelf label system according to the embodiment.

DETAILED DESCRIPTION

Figure 3:
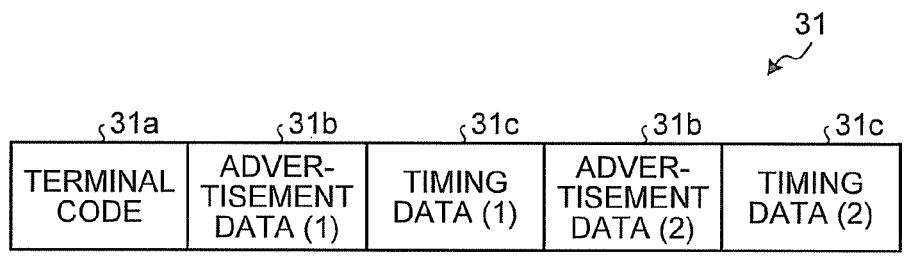
FIG. 3 is a diagram illustrating data transmitted from an ESL server to an advertisement terminal in the electronic shelf label system according to the embodiment.

An electronic shelf label system according to an embodiment includes a shelf label terminal, an advertisement terminal, and a management server. The shelf label terminal displays shelf label information based on received shelf label data. The advertisement terminal displays advertisement information based on received advertisement data. The management server transmits the shelf label data to the shelf label terminal and transmits the advertisement data to the advertisement terminal.

As shown in FIG. 1, an electronic shelf label system 1 according to an embodiment of the invention includes a product DB (database) 10, a POS (Point Of Sales) server 20, an ESL (Electronic Shelf Label) server 30, handy terminals 40, an access point 50, relay apparatuses 51, an advertisement terminal 60, and shelf label terminals 70. In this embodiment, the ESL server 30 corresponds to a management server.

In the electronic shelf label system 1, the product DB 10, the POS server 20, the ESL server 30, the access point 50, the relay apparatuses 51, and the like are connected to each other via a wired network 2. The handy terminal 40 is connected to the access point 50 via a wireless transmission path 3. In addition, the advertisement terminal 60, the shelf label terminals 70, and the like are connected to the relay apparatuses 51 via the wireless transmission path 3. In this embodiment, the wired network 2 or the wireless transmission path 3 corresponds to an electronic communication line.

The product DB 10 is a database apparatus that stores or manages various kinds of information regarding the products in a store. As shown in FIG. 2, the product DB 10 stores product data 10a having information regarding a product name, a product unit cost, a product sale price, a product identification code, and the like in association with a product code.

The POS server 20 is a computer which is in charge of a main unit of a POS system and is connected to a POS terminal (not shown) via a wired or wireless communication line (not shown). The POS terminal registers sale data of products purchased by customers and processes payments according to various payment methods such as cash, a credit card, a prepaid card, electronic money, and a debit card.

The ESL server 30 is configured as an information processing apparatus that manages the ESL system and controls the operations of the advertisement terminal 60 and the shelf label terminal 70. Specifically, the ESL server 30 displays the shelf label information regarding the corresponding products in the shelf label terminal 70 and displays the corresponding advertisement information on the advertisement terminal 60.

The advertisement information displayed on the advertisement terminal 60 is prepared (generated) in advance in the ESL server 30 or a personal computer (not shown). In a storage unit 106 (see FIG. 4) of the ESL server 30, the terminal code (for example, an IP address) of the advertisement terminal 60 and advertisement data are stored in association therewith. The ESL server 30 acquires the data from the memory unit and transmits data 31 shown in FIG. 3 to the advertisement terminal 60. The data 31 includes a terminal code 31a, advertisement data (1) 31b, timing data (1) 31c corresponding to the advertisement data (1) 31b, advertisement data (2) 31b, and timing data (2) 31c corresponding to the advertisement data (2) 31b. The timing data 31c is data indicating a timing at which the advertisement data 31b is displayed on the advertisement terminal 60. For example, the timing data 31c can include a display time (for example, 12 pm, 15 pm, or 17 pm) or a display interval (for example, at a 3-hour interval or a 2-hour interval).

Figure 4:
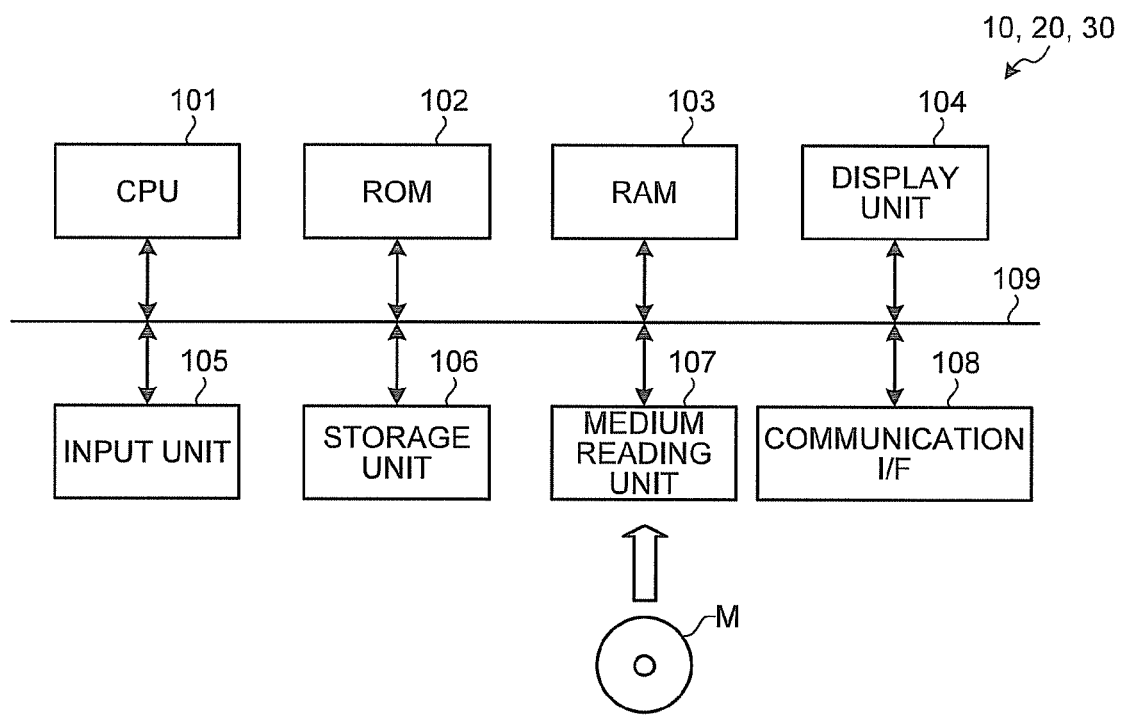
FIG. 4 is a block diagram illustrating the overall configuration of a product database, a POS server, and an ESL server in the electronic shelf label system according to the embodiment.

The product DB 10, the POS server 20, the ESL server 30, and the like can be configured by a computer. According to this embodiment, as shown in FIG. 4, a computer operating as the product DB 10, the POS server 20, and the ESL server 30 includes a CPU (central processing unit) 101, a ROM (Read-Only Memory) 102, a RAM (Random Access Memory) 103, a display unit 104, an input unit 105, a storage unit 106, a medium reading unit 107, and a communication interface 108. These units are connected to the each other through a bus 109. Among these units, the ROM 102 is a read-only memory storing a BIOS and the like. The RAM 103 stores various kinds of data so as to be rewritten. The display unit 104 is configured by, for example, an LCD (Liquid Crystal Display) and displays processing progress or result. The input unit 105 is configured by a pointing device such as a keyboard or a mouse and transmits input data to the CPU 101 according to an instruction of an operator. The storage unit 106 is configured by, for example, a hard disk drive (HDD) and stores various kinds of data, programs, or the like. The medium reading unit 107 is configured by, for example, a CD-ROM drive and transmits and receives data to and from a storage medium M. The communication interface 108 is in charge of communication with other external apparatuses via respective communication lines.

When the operator turns on each computer, the CPU 101 activates a loader (program) of the ROM 102 and reads an OS (an operating system which is a program managing hardware and software of a computer) from the storage unit 106 to the RAM 103 to activate the OS. The OS activates an application program, reads information, and stores information according to the operation of the operator. In addition, the application program is not limited to a case where the application program operates on the OS. Some of the various kinds of operations, which are described below, of the application program may be taken over by the OS. Moreover, the application program may be included as a part of a program file of a group forming a predetermined application software, the OS, or the like.

In this embodiment, a computer functions as the product DB 10, the POS server 20, or the ESL server 30 according to a difference in an application program stored in the storage unit 106 or the like.

In general, the application program installed in the storage unit 106 of the computer is recorded in a storage medium M such as various kinds of optical disks such as a CD-ROM and a DVD, various kinds of magneto-optical disks, various kinds of magnetic disks such as a flexible disk, and various kinds of media such as a semiconductor memory. In addition, an operation program recorded in the storage medium M is installed in the storage unit 106. Therefore, a flexible storage medium M such as an optical information record medium such as a CD-ROM or a magnetic medium such as an FD may also serve as a storage medium storing the application program. Moreover, for example, the application program may be transmitted from the outside via the communication interface 108 and may be installed in the storage unit 106.

The handy terminal 40 is a portable information processing apparatus which is operated by a sales assistant of a store and can read the terminal code of the shelf label terminal 70 and the product code of the product. The terminal code and the product code read by the handy terminal 40 are transmitted to the ESL server 30 via the access point 50 and are stored in the storage unit 106 of the ESL server 30 in association therewith.

Figure 5:
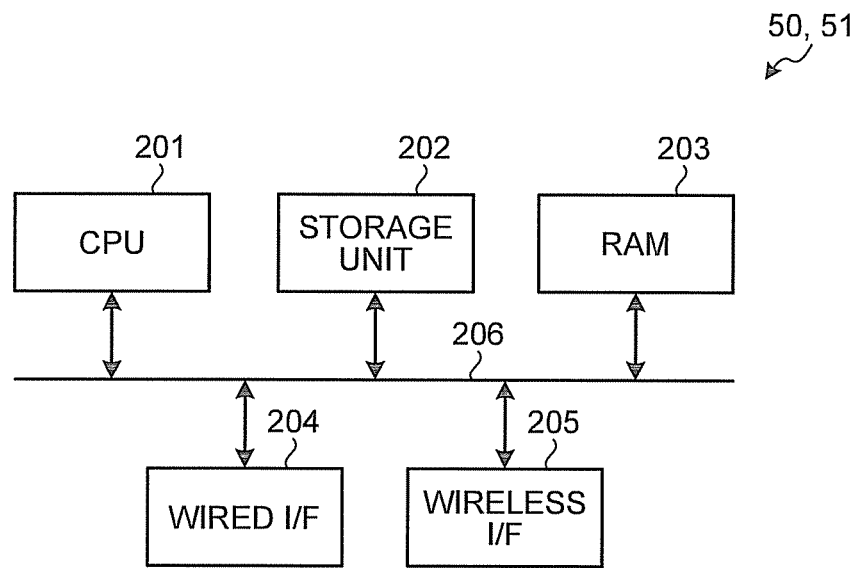
FIG. 5 is a block diagram illustrating the overall configuration of an access point and a relay apparatus in the electronic shelf label system according to the embodiment.

The access point 50 and the relay apparatus 51 are general wireless communication apparatuses. As shown in FIG. 5, the wireless communication apparatuses serving as the access point 50 and the relay apparatus 51 include a CPU 201 executing information processing such as protocol conversion, a non-volatile storage unit 202 storing BIOS, various kinds of programs, setting information, and the like, a RAM 203 storing various kinds of data in a writable manner, a wired interface 204 delivering information by communicating with another apparatus through a wired LAN, and a wireless interface 205 delivering information by communicating with another wireless apparatus. These units are connected to a bus 206. The access point 50 is a wireless network apparatus connecting an apparatus (the ESL server 30) connected to the wired network 2 to the handy terminal 40 or the like and converts a protocol between the wireless LAN (Local Area Network) and the wired LAN. The communication methods of the access point 50 and the relay apparatus 51 are different from each other. For example, a wireless communication standard (for example, the IEEE 802.15.4 standard) for short distance communication, an infrared communication standard, or the like is applied to the relay apparatus 51. When the short distance communication method is used, the power consumption of the shelf label terminal 70 or the advertisement terminal 60 can be reduced and the exchange frequency of a battery can be reduced. Moreover, when a battery exchanging configuration is not used, the life of the terminal can be prolonged. Moreover, when the short distance communication method is used, it is not necessary to allocate an IP address to each terminal communicating with the relay apparatus 51. Therefore, the number of shelf label terminals 70 or advertisement terminals 60 installed can easily be increased.

Figure 6:
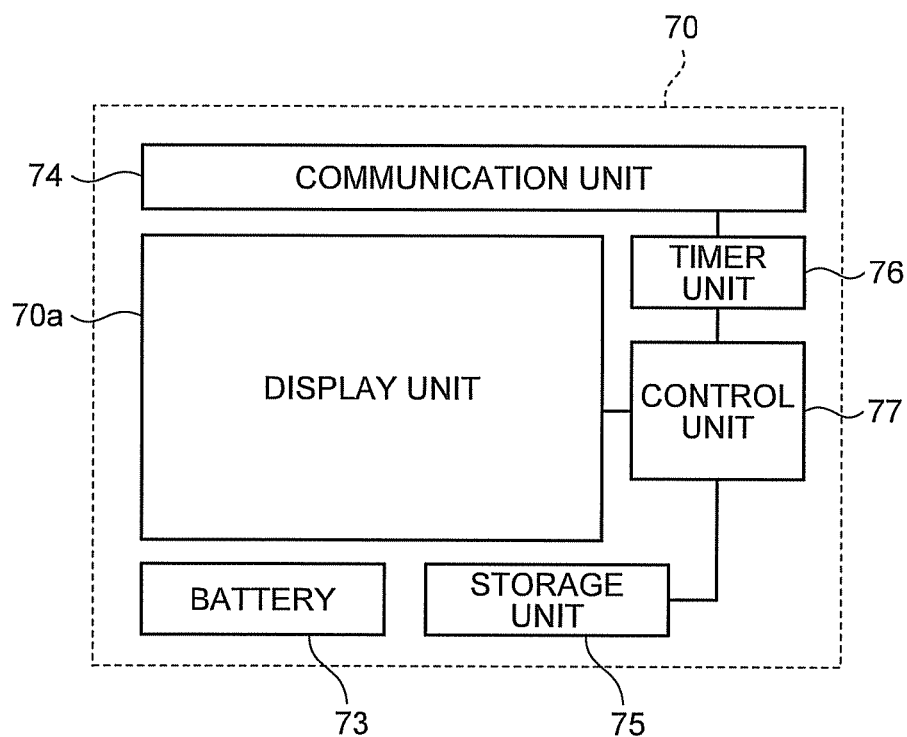
FIG. 6 is a block diagram illustrating the overall configuration of a shelf label terminal in the electronic shelf label system according to the embodiment.

The shelf label terminal 70 is disposed in the edge of a product display section in a store and displays (shows) information (for example, a product name, a price, a weight, or the like) regarding products. As shown in FIG. 6, the shelf label terminal 70 includes a display unit 70a, a battery 73, a communication unit 74, a storage unit 75, a timer unit 76, and a control unit 77.

Figure 7:
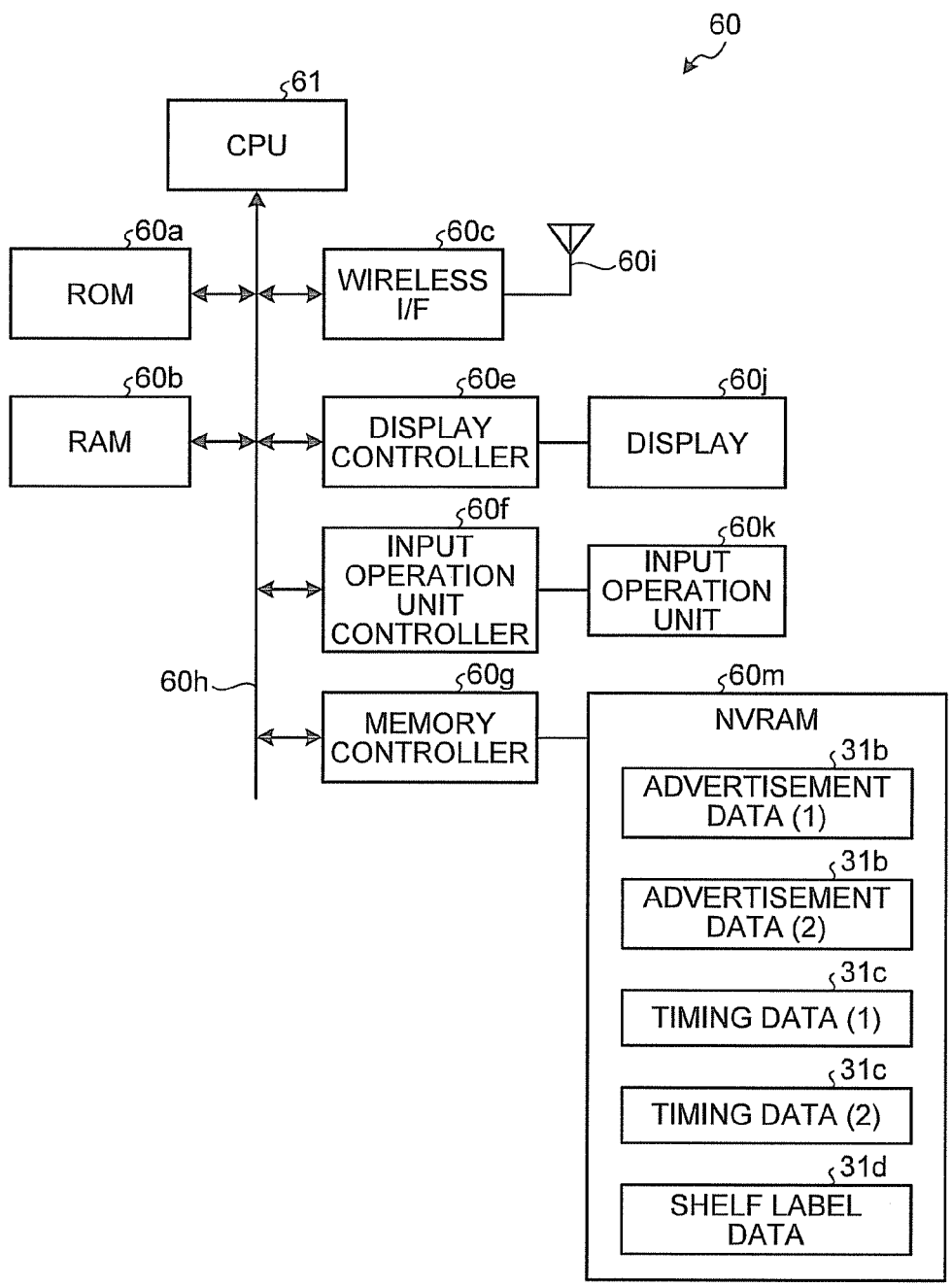
FIG. 7 is a block diagram illustrating the overall configuration of an advertisement terminal in the electronic shelf label system according to the embodiment.

As shown in FIG. 7, the advertisement terminal 60 includes a CPU 61, a ROM 60a, a RAM 60b, a wireless interface (I/F) 60c, a display controller 60e, an input operation unit controller 60f, and a memory controller 60g. As shown in FIG. 7, these units are connected to each other through a bus line 60h such as an address bus and a data bus. Moreover, the advertisement terminal 60 further includes an antenna 60i, a display (for example, an LCD or a piece of electronic paper) 60j, an input operation unit 60k, and an NVRAM (Non Volatile RAM) 60m serving as a storage unit. When a communication method of the relay apparatus 51 is an infrared communication method, the wireless interface 60c serves as an infrared communication interface.

The CPU 61 controls the advertisement terminal 60 by executing various kinds of computer-readable programs stored in the ROM 60a. The ROM 60a stores various kinds of programs executed by the CPU 61 and various kinds of data. The RAM 60b temporarily stores data or various kinds of programs when the CPU 61 executes the programs.

The wireless interface 60c controls data communication with another apparatus wirelessly connected via the antenna 60i. The display controller 60e displays the colors of characters and the like corresponding to display data given from the CPU 61 by controlling the operation of the display 60j displaying advertisement information. The input operation unit controller 60f receives a signal corresponding to an operation of an operator from the input operation unit 60k including, for example, a press button or a key switch and notifies the CPU 61 of the signal. The display 60j can be configured as a touch panel type display and includes a touch panel sensor as the input operation unit 60k.

The memory controller 60g controls writing and reading data into or from the NVRAM 60m based on an instruction signal from the CPU 61. The NVRAM 60m stores data (the advertisement data 31b or the timing data 31c corresponding thereto) received from the ESL server 30 via the wireless interface 60c. Moreover, the advertisement terminal 60 also stores the shelf label data 31d when the advertisement terminal 60 is disposed near or associated electronically and is associated with a specific product and thus the advertisement terminal 60 has the function of the shelf label terminal 70. The shelf label data 31d is transmitted from the ESL server 30 separate from the data including the advertisement data 31b.

Figure 8:
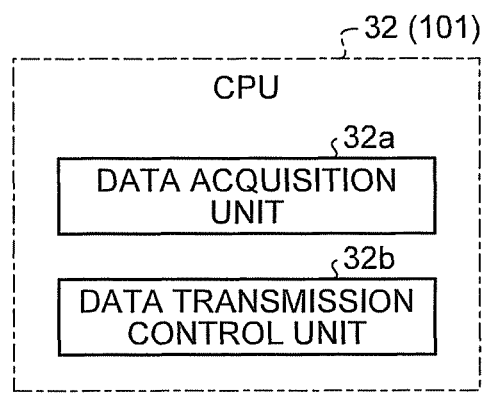
FIG. 8 is a block diagram illustrating the overall configuration of a CPU of the ESL server in the electronic shelf label system according to the embodiment.

Hereinafter, the display of the advertisement information on the advertisement terminal 60 will be described with reference to FIGS. 8 to 13. As shown in FIG. 8, a CPU 32 (101) of the ESL server 30 functions as a data acquisition unit 32a and a data transmission control unit 32b. Accordingly, a program operating the CPU 32 includes at least a module operating as the data acquisition unit 32a and a module operating as the data transmission control unit 32b.

Figure 9:
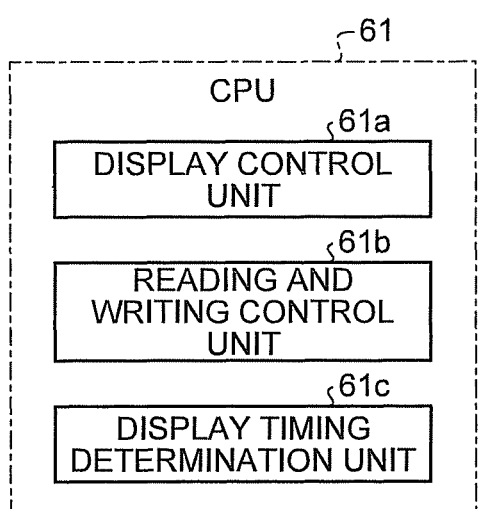
FIG. 9 is a block diagram illustrating the overall configuration of a CPU of the advertisement terminal in the electronic shelf label system according to the embodiment.

As shown in FIG. 9, a CPU 61 of the advertisement terminal 60 functions as a display control unit 61a, a reading and writing control unit 61b, and a display timing determination unit 61c. Accordingly, a program operating the CPU 61 includes a module operating as the display control unit 61a, a module operating as the reading and writing control unit 61b, and a module operating as the display timing determination unit 61c.

As shown in FIG. 10, the CPU 32 of the ESL server 30 first acquires the advertisement data 31b, the terminal code 31a, the timing data 31c, and the like (Act 10 and Act 11) and transmits these data packets to the advertisement terminal 60 at a predetermined timing (Act 12). The ESL server 30 transmits the data to the advertisement terminal 60 at various timings, for example, before opening of a store (or during preparation time) or during opening hours or the like. When the ESL server 30 transmits the data before opening of a store, the ESL server 30 can transmit the plurality of advertisement data 31b together with the timing data 31c corresponding to the plurality of advertisement data 31b. Alternatively, the ESL server 30 can transmit the advertisement data 31b immediately before the timing at which the advertisement information is displayed on the advertisement terminal 60. In this case, the advertisement terminal 60 displays the advertisement information based on the advertisement data 31b immediately after receiving the advertisement data 31b.

When the plurality of advertisement data 31b is transmitted in advance from the ESL server 30 to the advertisement terminal 60, as shown in FIG. 11, the CPU 61 of the advertisement terminal 60 first operates as the reading and writing control unit 61b and stores the received advertisement data 31b in the NVRAM 60m serving as a storage unit. At this time, the reading and writing control unit 61b also stores the timing data 31c corresponding to the advertisement data 31b (Act 20).

Next, the CPU 61 operates as the display timing determination unit 61c if the timing is within opening hours (Yes in Act 21). Then, the CPU 61 determines whether the current time is a display timing corresponding to one of the timing data 31c (Act 22). If the current time is the display timing (Yes in Act 22), the CPU 61 operates as the display control unit 61a and displays the advertisement information based on the advertisement data 31b corresponding to the timing data 31c on the display 60j (Act 23). On the other hand, if the timing is not within opening hours (No in Act 21), the process ends. On the other hand, if the current time is not the display timing corresponding to one of the timing data 31c (No in Act 22), the process returns to Act 21. According to the sequence shown in FIG. 11, the advertisement terminal 60 can display the advertisement information based on the advertisement data 31b received from the ESL server 30 at the timing designated by the timing data 31c corresponding to the advertisement data 31b.

Figure 12:
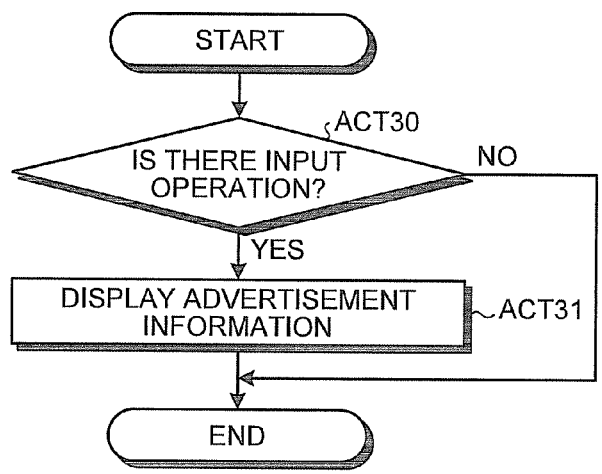
FIG. 12 is a flowchart illustrating another example of a sequence in which the advertisement terminal displays advertisement information in the electronic shelf label system according to the embodiment.

The advertisement terminal 60 can display the advertisement information based on the advertisement data 31b according to an input operation of an operator. When the NVRAM 60m serving as the storage unit of the advertisement terminal stores the plurality of advertisement data 31b, the advertisement terminal 60 can switch and display a plurality of advertisement information respectively based on the plurality of advertisement data 31b according to the input operation of the operator. In this case, as shown in FIG. 12, if the CPU 61 of the advertisement terminal 60 operates as the display control unit 61a and receives a signal indicating a predetermined operation of the input operation unit 60k by the operator from the input operation unit controller 60f (Yes in Act 30), the CPU 61 can display the advertisement information (Act 31). On the other hand, if the predetermined input is not operated in the input operation unit 60k (No in Act 30), the advertisement terminal 60 does not display the advertisement information. The operator of the input operation unit 60k displaying the advertisement information may be a sales assistant or a customer.

Moreover, the ESL server 30 transmits a display instruction signal to the advertisement terminal 60 and the advertisement terminal 60 receiving the display instruction signal can display the advertisement information. In this case, the ESL server 30 transmits the display instruction signal to all of the advertisement terminals 60 and all of the advertisement terminals 60 can display the advertisement information. At this time, the ESL server 30 can transmit data designating the advertising data 31b to display the advertisement information. The ESL server 30 can transmit the display instruction signal together with the terminal code 31a and only the advertisement terminals 60 corresponding to the terminal code 31a can display the advertisement information.

Figure 13:
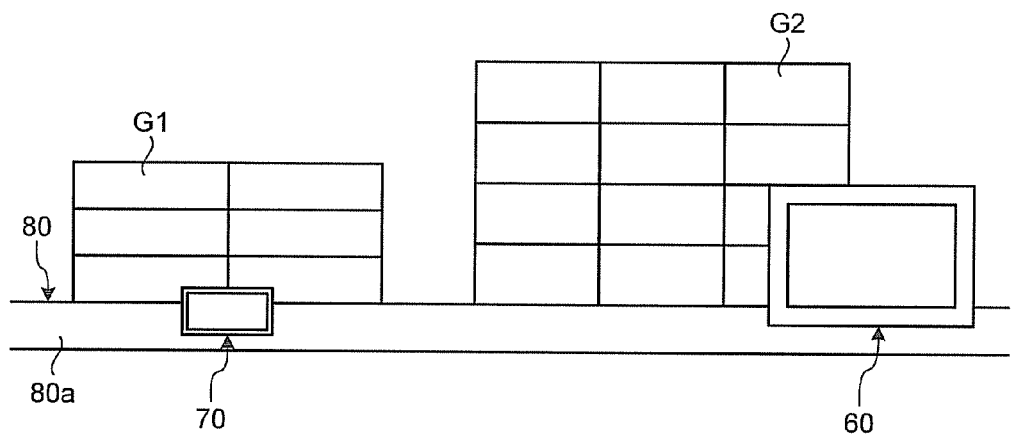
FIG. 13 is a schematic diagram illustrating an example of a shelf label terminal and an advertisement terminal installed in a display section of products in the electronic shelf label system according to the embodiment.
Figure 14:
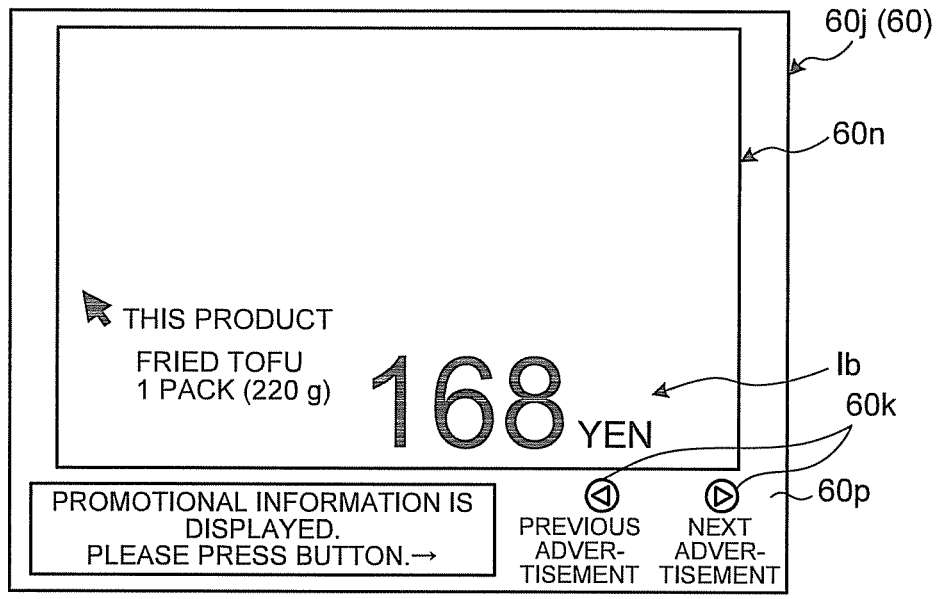
FIG. 14 is a diagram illustrating an example of information displayed on the advertisement terminal in the electronic shelf label system according to the embodiment.
Figure 15:
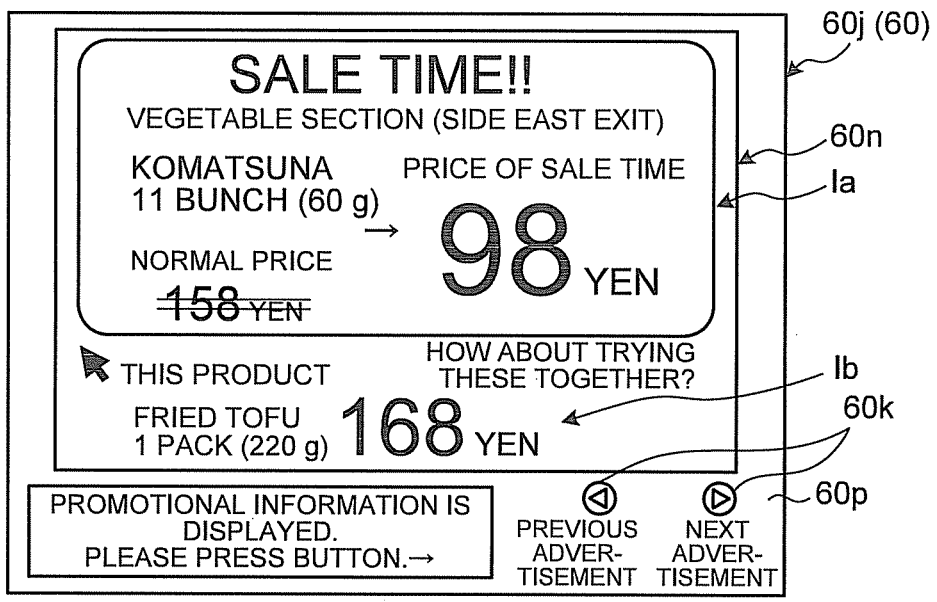
FIG. 15 is a diagram illustrating another example of information displayed on the advertisement terminal in the electronic shelf label system according to the embodiment.
Figure 16:
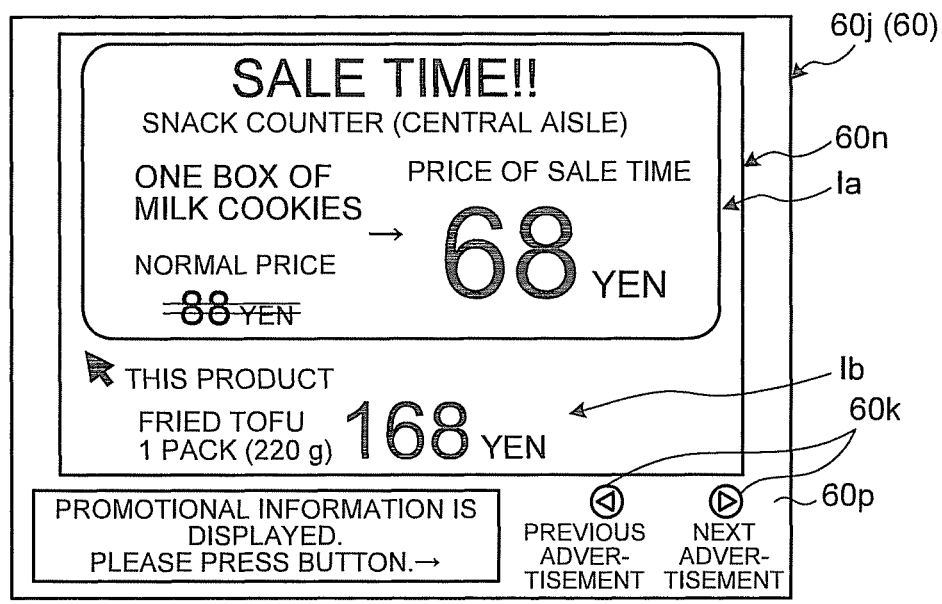
FIG. 16 is a diagram illustrating still another example of information displayed on the advertisement terminal in the electronic shelf label system according to the embodiment.

As illustrated in FIG. 13, the shelf label terminal 70 and the advertisement terminal 60 can be installed in the front edge portion 80a of a display stand 80 or on the display stand 80 on which, for example, products G1 and G2 are installed. In the example of FIG. 13, the shelf label terminal 70 displays shelf label information regarding the product G1 and the advertisement terminal 60 displays advertisement information Ia together with the shelf label information Ib regarding the product G2, as shown in FIGS. 14 to 16. The advertisement information Ia may be advertisement information regarding the product G2 and advertisement information regarding a product (not shown) different from the product G2.

FIGS. 14 to 16 are diagrams illustrating an example of the advertisement information Ia or the shelf label information Ib displayed on the display 60j of the advertisement terminal 60. A press button serving as an input operation unit 60k is formed on an edge portion (front surface) 60p of a display screen 60n of the display 60j. An operator (for example, a sales assistant or a customer) can switch information displayed on the display screen 60n by operating the input operation unit 60k. The display 60j preferably has a display screen 60n which is several times (for example, twice to five times) larger than that of the shelf label terminal 70.

As shown in FIG. 14, the advertisement terminal 60 can mainly display the shelf label information Ib when the current time is not the display timing of the advertisement information Ia, when the operator does not operate the input operation unit 60k, when the advertisement terminal 60 does not receive the display instruction signal from the ESL server 30, or the like. Moreover, as shown in FIG. 15, the advertisement terminal 60 can display both the shelf label information Ib and the advertisement information Ia, when the current time is the display timing (for example, a time or a period in which products are discounted or the sales of the product are promoted) of the advertisement information Ia, when the operator operates the input operation unit 60k, when the advertisement terminal 60 receives the display instruction signal from the ESL server 30, or the like. In this case, when a predetermined time passes after the display of both the shelf label information Ib and the advertisement information Ia on advertisement terminal 60, the advertisement terminal 60 does not display the shelf label information Ib and can display the advertisement information Ia. Moreover, the shelf label information Ib and the advertisement information Ia can be displayed together on the advertisement terminal 60 a predetermined number of times. In this case, the number of times which the shelf label information Ib and the advertisement information Ia are displayed together is determined in advance and the shelf label information Ib and the advertisement information Ia can be displayed together within the range of the number of times on the advertisement terminal 60. However, when the display number of times exceeds the predetermined number of times, the advertisement information Ia is displayed but the shelf label information Ib is not displayed on the advertisement terminal 60 although the advertisement terminal 60 receives the shelf data from the ESL server 30. Moreover, even when the advertisement terminal 60 receives the shelf label data, it is possible to realize a display method of displaying the advertisement information Ia without displaying the shelf label information Ib during a predetermined time period. Moreover, as shown in FIG. 16, the advertisement terminal 60 can display the advertisement information Ia different from that shown in FIG. 15. That is, the advertisement terminal 60 can switch and display a plurality of different advertisement information Ia while displaying the shelf label information Ib.

In the example of FIG. 14, the display control unit 61a acquires the advertisement data 31b and the shelf label data 31d from the NVRAM 60m serving as the storage unit, generates a synthesized screen data thereof, and displays the synthesized screen data on the display screen 60n of the display 60j. In the example, when the advertisement information Ia is displayed, as in FIGS. 15 and 16, under the control of the display control unit 61a, the size of the shelf label information Ib is reduced more than when only the shelf label information Ib is displayed, as in FIG. 14. Thus, the advertisement information Ia can become further noticeable. In this example, the advertisement information Ia and the shelf label information Ib are displayed together. However, the advertisement information Ia and the shelf label information Ib may be switched and displayed or only the advertisement information Ia may be displayed.

As described above, the electronic shelf label system 1 according to this embodiment includes the ESL server 30 serving as the management server, the shelf label terminal 70 displaying the shelf label information based on the shelf label data received from the ESL server 30, and the advertisement terminal 60 displaying the advertisement information based on the advertisement data 31b received from the ESL server 30. Accordingly, it is possible to obtain the advantage that it is easy to update the advertisement information by changing the advertisement data. Moreover, the advertisement information can be displayed on all of the plurality of advertisement terminals 60 at once and thus advertisement effect of the advertisement information can be improved. The advertisement information regarding products can be displayed on the advertisement terminal 60 which is distant from a sales place of the products. Moreover, since the advertisement data can be displayed using an electronic communication line transmitting the shelf label data, a simpler system can be embodied compared to a system in which an electronic communication line transmitting the shelf label data and an electronic communication line transmitting the advertisement data are constructed separately. Moreover, since only the advertisement terminal 60 is added and only the program of the ESL server 30 is updated in a store using the electronic shelf label system, it is possible to obtain the advantage that it is easy to use the system at relatively low cost.

In this embodiment, the advertisement terminal 60 can display the advertisement information based on the display instruction signal transmitted by the ESL server 30. Accordingly, the display of the advertisement information on the advertisement terminal 60 can be remotely controlled from the ESL server 30. The display of the advertisement information on the plurality of advertisement terminals 60 can be controlled in block.

In this embodiment, the advertisement terminal 60 includes the NVRAM 60m serving as the storage unit that stores the plurality of advertisement data and the display control unit 61a displaying the advertisement information respectively based on the plurality of advertisement data 31b on the display 60j serving as a display unit. Accordingly, the advertisement terminal 60 can easily switch and display the plurality of advertisement information. Moreover, it is possible to swiftly switch and display a lot of advertisement information without having to individually communicate the advertisement data 31b.

In this embodiment, the display control unit 61a can display the advertisement information respectively based on the plurality of advertisement data 31b on the display 60j serving as the display unit at the predetermined set display timing. Accordingly, since the advertisement terminal 60 can switch and display the advertisement information at the display timing appropriately set in advance, advertisements can be more effective.

In this embodiment, the advertisement terminal 60 includes the input operation unit 60k and thus can display the advertisement information based on the operation of the input operation unit 60k by an operator. Accordingly, the advertisement terminal 60 can display or switch the advertisement information according to the needs or a reading speed of the operator. In particular, as shown in FIGS. 14 to 16, the input operation unit 60k may be appropriately disposed on the front surface of the advertisement terminal 60 so that the a customer can operate an input.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic shelf label system comprising:
    a server configured to transmit shelf label data, advertisement data, and timing data indicating a timing at which advertisement information corresponding to the advertisement data is to be displayed; and
    an electronic shelf label including at least one processor and configured to receive the shelf label data, the advertisement data, and the timing data from the server and compare a current time with the timing at which the advertisement information is to be displayed, and to, in response to a determination that the current time is the timing at which the advertisement information is to be displayed, display the advertisement information together with shelf label information corresponding to the shelf label data and to, in response to a determination that the current time is not the timing at which the advertisement information is to be displayed, display the shelf label information, wherein
    the electronic shelf label is configured to, when displaying the advertisement information together with the shelf label information, display the shelf label information in a size smaller than a size of the shelf label information displayed when the current time is not the timing at which the advertisement information is to be displayed.

2. The system according to claim 1, wherein the electronic shelf label comprises a storage unit configured to store the advertisement data and a display control unit configured to display the advertisement information respectively based on the advertisement data.

3. The system according to claim 2, wherein the display control unit is further configured to display the advertisement information respectively based on the advertisement data at a preset display timing on a display unit.

4. The system according to claim 1, wherein the electronic shelf label comprises an input operation unit configured to operate an input to display the advertisement information.

5. The system according to claim 1, wherein the electronic shelf label is further configured to switch between different sets of advertisement information.

6. An electronic shelf label comprising:
    a display control unit comprising at least one processor and configured to receive, from a server, shelf label data, advertisement data, and timing data indicating a timing at which advertisement information corresponding to the advertisement data is to be displayed and compare a current time with the timing at which the advertisement information is to be displayed, and to, in response to a determination that the current time is the timing at which the advertisement information is to be displayed, display the advertisement information together with shelf label information corresponding to the shelf label data and to, in response to a determination that the current time is not the timing at which the advertisement information is to be displayed, display the shelf label information, wherein
    the display control unit is further configured to, when displaying the advertisement information together with the shelf label information, display the shelf label information in a size smaller than a size of the shelf label information displayed when the current time is not the timing at which the advertisement information is to be displayed.

7. The electronic shelf label according to claim 6, further comprising:
    a storage unit configured to store the advertisement data,
    wherein the display control unit is further configured to display the advertisement information respectively based on the advertisement data on a display unit.

8. The electronic shelf label according to claim 7, wherein the display control unit is further configured to display the advertisement information respectively based on the advertisement data at a preset display timing on the display unit.

9. The electronic shelf label according to claim 6, further comprising:
    an input operation unit configured to operate an input to display the advertisement information.

10. The electronic shelf label according to claim 6, wherein the display control unit is further configured to switch between different sets of advertisement information for display on the display unit.

11. A non-transitory computer-readable medium storing a program causing a computer to function as a display control unit configured to:
    receive, from a server, shelf label data, advertisement data, and timing data indicating a timing at which advertisement information corresponding to the advertisement data is to be displayed and compare a current time with the timing at which the advertisement information is to be displayed, and to, in response to a determination that the current time is the timing at which the advertisement information is to be displayed, display the advertisement information together with shelf label information corresponding to the shelf label data and to, in response to a determination that the current time is a timing other than the timing at which the advertisement information is to be displayed, display the shelf label information, wherein
    when displaying the advertisement information together with the shelf label information, the display control unit is configured to display the shelf label information in a size smaller than a size of the shelf label information displayed when the current time is the timing other than the timing at which the advertisement information is to be displayed.

12. The non-transitory computer-readable medium according to claim 11, wherein the display control unit is further configured to display the advertisement information respectively based on the advertisement data on the display control unit.

13. The non-transitory computer-readable medium according to claim 12, wherein the display control unit is further configured to display the advertisement information respectively based on the advertisement data at a preset display timing on the display control unit.

14. The non-transitory computer-readable medium according to claim 11, wherein the display control unit is further configured to display the advertisement information based on an input operation of an input operation unit provided in the display control unit.

15. The non-transitory computer-readable medium according to claim 11, wherein the display control unit is further configured to switch between different sets of advertisement information to be displayed on the display control unit.

* * * * *